April 9, 1946. E. GFELLER 2,398,222
DEVICE FOR EXCHANGEABLY MOUNTING TOOLS
Filed Nov. 20, 1943
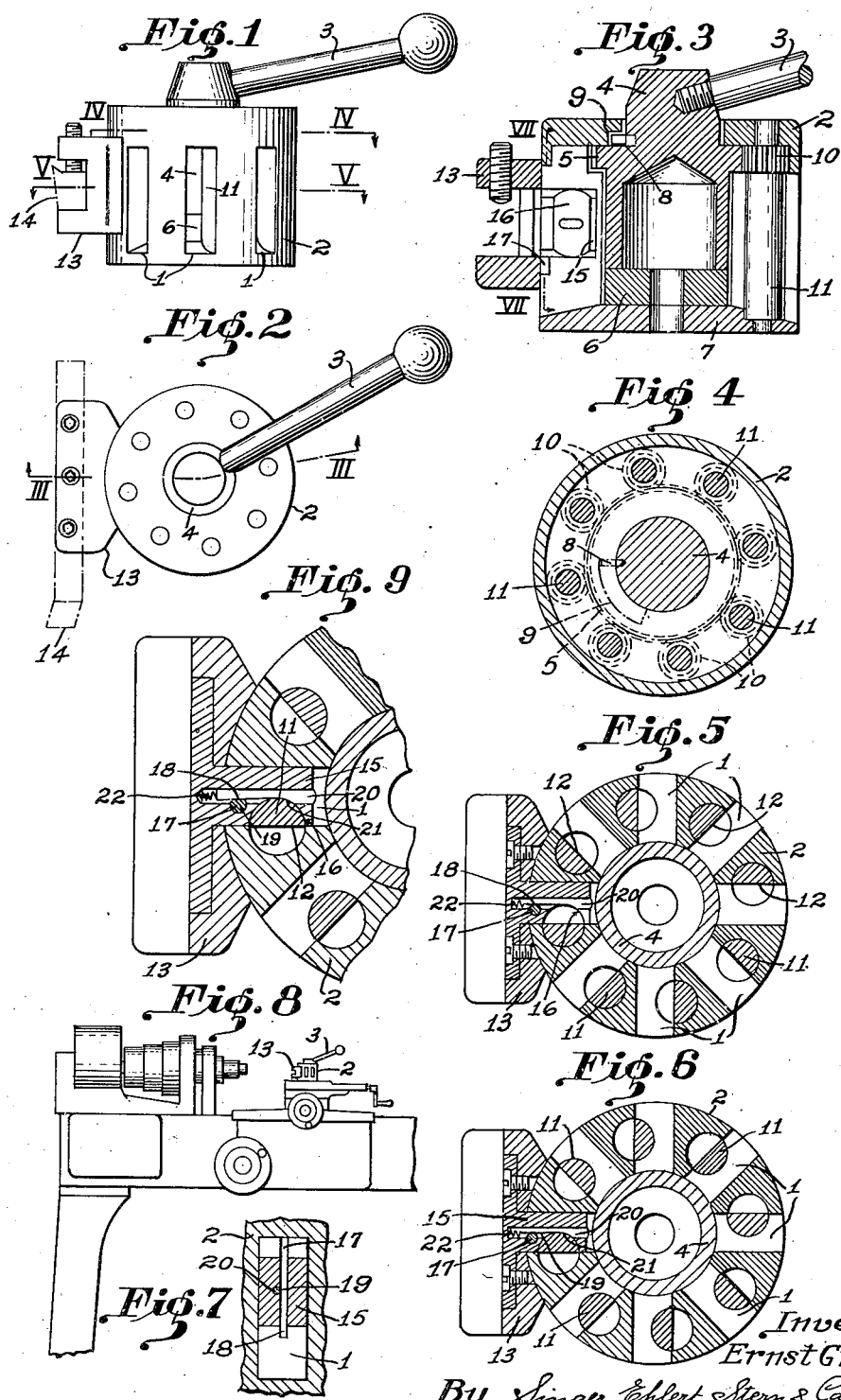

Patented Apr. 9, 1946

2,398,222

UNITED STATES PATENT OFFICE 2,398,222

DEVICE FOR EXCHANGEABLY MOUNTING TOOLS

Ernst Gfeller, Zurich, Switzerland

Application November 20, 1943, Serial No. 511,014
In Switzerland September 28, 1942

5 Claims. (Cl. 29—48)

The present invention relates to a device for exchangeably mounting tools, especially on lathes. The novel device is characterized in that a cylindrical holder is provided at its circumference with radially disposed prismatic guides and in that clamping bolts of semi-circular cross sections are recessed into one wall of each of the said prismatic guides so that the flat side of the bolts may come to flush with the wall of the prismatic guides, each of the said clamping bolts being rotatable by means of a common handle. At least one tool holder adapted to bear exactly against the circumference of the cylindrical holder is provided with a projection adapted to enter one of the said prismatic guides.

The device according to this invention is preferably arranged as a tool-holder on a lathe where it allows, if suitably constructed, a practically indefinite number of operations and the use of numerous different tools. According to one especial embodiment means are provided for repeatedly mounting for instance lathe tools in exactly the same position whereby the highest requirements as to precision may be fulfilled. The described construction of the tool holder allows a considerable gain of time.

One preferred modification of the object of the invention is represented in the drawing in which there shows:

Fig. 1 a side elevation;
Fig. 2 plan view;
Fig. 3 a section on line III—III of Figure 2;
Fig. 4 a section on line IV—IV of Figure 1;
Fig. 5 a section on line V—V of Figure 1;
Fig. 6 a section according to that represented in Figure 5 whereby, however, the clamping bolts are shown in their working position;
Fig. 7 is a partial section on line VII—VII of Figure 3;
Fig. 8 is a partial view of a lathe provided with the novel device, and
Fig. 9 illustrates in an enlarged scale and in section similar to Fig. 6 the particular construction of the radial locking bolt which holds the stop bolt in place.

The device represented in the drawing for exchangeably mounting tools may be used with especial advantage on lathes where it is secured, as shown in Figure 8, in the place of the usual tool holder or clamping device by means of the well known central screw. The new device is provided with a cylindrical holder 2 which is provided at its circumference with prismatic guides 1. In the axis of the holder 2 a handle 3 is rotatably mounted. Handle 3 is fixedly connected with a rotary body 4 which bears a toothed wheel 5 and rests against a disk 6. The latter rests on bottom plate 7 of the holder 2. The movement of handle 3 and therefore also of the body 4 is limited by a stop 8 which moves in a sector shaped recess 9 of the holder 2. The toothed wheel 5 engages pinions 10 of the clamping bolts 11. In the modification represented in the drawing eight clamping bolts and therefore eight pinions 10 meshing with the toothed wheel 5 are shown. When rotating handle 3, body 4, toothed wheel 5 and necessarily all the pinions 10 and the clamping bolts 11 are rotated. The latter are, as may be seen from the Figures 4 to 6 of semi-circular cross section. They are recessed in such a way into one wall of the prismatic guides 1 that their flat face 12 comes to flush with the corresponding wall of the prismatic guides. A tool holder 13 is removably secured to the holder 2, and is shown to support a lathe tool 14. The body of the holder 13 has the arcuate surface fitting accurately against the outer cylindrical surface of the holder 2, and this body is equipped with a T-shaped fixture 15, the projecting arm of which is adapted for insertion into the guides or passages 1 and is exactly guided in any of said passages 1. Projection 15 is provided with a recess 16 of semi-circular cross section into which one of the clamping bolts 11 may enter. The diameter of the clamping bolts corresponding exactly to the diameter of the semi-circular recesses 16. When handle 3 is rotated the clamping bolts 11 are therefore rotated from the position shown in Figure 5 into the working position according to Figure 6 and the clamping bolt 11 presses the tool holder 13 against the cylindrical circumference of the holder 2.

A pin 17 is insertable into the projection 15 in direction of the axis of the holder 2. This pin which may be of substantially cylindrical surface has a flat face 18 for engagement with another pin 20 which also is inserted in the projection 15 of the tool holder 13, but extends radially of the holder body 2. This last named pin 20 is provided with a wedge-shaped portion having a flat face 19 for engagement with the flat face 18 of the axial pin 17 and the radial pin 20 is under the influence of a spring 22 which has a tendency to force the pin 20 radially towards the axis of the body 2. As, however, the flat face 19 of the pin 20 is inclined to a radius instead of being parallel thereto, the spring 22 will enforce frictional engagement between the surfaces 18 and 19. If, therefore, the pin 17 is axially inserted to a certain depth in its bore and then engaged by the radial pin 20, the projecting portion of the pin 17 will constitute a gauging portion for determining the axial positioning of the tool holder 13. Depending upon the length of the portion of pin 17 projecting above the equipment portion 15, the tool holder 13 can be positioned axially higher or lower on the holder body 2, always provided that the top of the pin 17 is for instance in sliding engagement with the top wall of the passage 1 into which the projection is to be inserted. The projection 15 also has a semicylindrical recess 16 which is intersected by a radial bore for the pin 20. The latter is shaped at 21, Fig. 6, to receive the semicylindrical portion of the clamping bolt 11 when the clamping bolt is turned to operative position, as shown in Fig. 6. Upon removal of the tool holder 13, which can be effected after the clamping bolt has been turned to inoperative position, Fig. 5, the radial pin 20 can be forced inwardly against the spring 22, and an adjustment of the axial gauging pin 17 can then be made to permit the tool holder 13 to be placed in a new axial position against the body 2.

The way in which the described device is used is evident from the foregoing description. As many tool holders as are necessary for a certain work to be done may be inserted into the prismatic guides 1. Each tool holder may be secured in its appropriate height by means of a bolt 17. If the height of the tool holder must be varied, bolt 20 must only be pressed against the action of spring 22 whereupon wedge surface 19 is moved away from bolt 17 which may now be moved. The simple and very accurate way of adjusting numerous tools allows a considerable gain of time.

When in practical use the device is covered by a protecting cover which is not shown in the drawing and which is rotatably mounted so as to cover the openings which are not in use and to prevent dirt from entering the same. This protecting cover extends over 270° of the cylindrical holder and bears therefore at both ends against the tool holder.

I claim:

1. In a device for exchangeably mounting tools, especially for lathes, the combination of a cylindrical holder provided with radially disposed prismatic guides, clamping bolts of semi-circular cross-section on a part of their lengths rotatably mounted in said holder, each of said clamping bolts being recessed into a wall of one of said prismatic guides so as to come flush with the same when not in the working position, at least one tool holder constructed to fit on the circumference of said cylindrical holder and provided with a projection extending into one of said prismatic guides, said projection being provided with a recess of semi-circular cross-section for receiving one of said clamping bolts when the latter are rotated into working position, and means including a handle for rotating all of said clamping bolts simultaneously.

2. In a device according to claim 1, an adjustable stop mounted on said tool-holder and constructed and arranged to engage the cylindrical holder when the projection of the tool holder is inserted in one of said prismatic guides.

3. In a device according to claim 1, an adjustable bolt mounted on the projection of the tool holder, said bolt being arranged to engage with either end thereof a wall of the prismatic guides in the cylindrical holder, said bolt having a flat surface and being movable in a direction parallel to the axis of the cylindrical holder, a second bolt axially disposed in said projection and movable in the direction of the projection, a wedge surface on said second bolt arranged to engage the flat surface on said first mentioned bolt, the second bolt being provided with a recess intersecting the semi-circular recess in the projection for receiving a portion of a clamping bolt.

4. In a device according to claim 1, an adjustable bolt mounted on the projection of the tool holder and arranged to engage with one end thereof a wall of the prismatic guide in said cylindrical holder, the said bolt having a flat surface and being movable in a direction parallel to the axis of the cylindrical holder, a second bolt axially disposed in the said projection and movable in the direction of the projection and radially with reference to the cylindrical holder, a wedge surface on the said second bolt arranged to engage the flat surface of the first mentioned bolt, the second bolt being provided with a recess intersecting the semi-circular recess in the projection which receives the clamping bolt, and a spring engaging one end of the second bolt for urging the wedge surface of the second bolt into locking engagement with the flat surface of the first bolt, said spring being located within the projection of the tool holder.

5. In a device for exchangeably mounting tools, especially for lathes, the combination of a cylindrical holder provided with radially disposed prismatic guides, clamping bolts of semi-circular cross-section on a part of their lengths rotatably mounted in the said holder, each of the said clamping bolts being recessed into a wall of one of the said prismatic guides so as to come flush with the same when not in the working position, at least one tool holder constructed to fit on the circumference of the said cylindrical holder and provided with a projection extending into one of the said prismatic guides, said projection being provided with a recess of semi-circular cross-section for receiving one of the said clamping bolts and means when the latter are rotated into working position, and means for rotating all of said clamping bolts simultaneously, said means including a rotatable handle, a gear fixedly secured to said handle, and a plurality of pinions, one for each of said clamping bolts and meshing with said gear.

ERNST GFELLER.